(12) United States Patent
Tu et al.

(10) Patent No.: US 12,384,221 B2
(45) Date of Patent: Aug. 12, 2025

(54) VEHICLE AND AIR CONDITIONING SYSTEM THEREOF

(71) Applicant: NIO TECHNOLOGY (ANHUI) CO., LTD, Hefei (CN)

(72) Inventors: Jiafu Tu, Shanghai (CN); Lei Xue, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 195 days.

(21) Appl. No.: 18/178,292

(22) Filed: Mar. 3, 2023

(65) Prior Publication Data
US 2023/0278395 A1 Sep. 7, 2023

(30) Foreign Application Priority Data
Mar. 7, 2022 (CN) .......................... 202210217407.4

(51) Int. Cl.
*B60H 1/00* (2006.01)
*B60H 1/32* (2006.01)

(52) U.S. Cl.
CPC ....... *B60H 1/00564* (2013.01); *B60H 1/3204* (2013.01)

(58) Field of Classification Search
CPC ............................................. B60H 2001/002
See application file for complete search history.

(56) References Cited

U.S. PATENT DOCUMENTS

| | | | | |
|---|---|---|---|---|
| 5,016,704 A | * | 5/1991 | Ono ................... | B60H 1/00064 165/203 |
| 5,181,553 A | * | 1/1993 | Doi .................... | B60H 1/00842 165/203 |
| 6,578,771 B2 | * | 6/2003 | Kaneura ............ | B60H 1/00828 237/12.3 B |
| 2009/0215379 A1 | * | 8/2009 | Matsunoo ............ | B60H 1/0005 454/160 |
| 2012/0247747 A1 | * | 10/2012 | DiGasbarro ....... | B60H 1/00028 165/122 |
| 2012/0252340 A1 | * | 10/2012 | Gannon ............. | B60H 1/00028 454/75 |

(Continued)

*Primary Examiner* — Lionel Nouketcha
(74) *Attorney, Agent, or Firm* — Sheridan Ross P.C.

(57) ABSTRACT

The disclosure relates to the technical field of air conditioning of vehicles, and in particular provides a vehicle and an air conditioning system thereof. The air conditioning system comprises: an air handling unit having a chamber, the air handling unit being capable of regulating the temperature of air entering the chamber; and an air duct group comprising an air supply duct in communication with an in-cabin space of the vehicle, the air supply duct comprising at least a back-row air duct that releases air to a back-row space in the in-cabin space. The air conditioning system further comprises a bypass air duct, at least part of which does not have an intersecting portion with the air handling unit so as to reduce, at least in part, the resistance due to air having to flow through the air handling unit on the premise of allowing the air to enter the back-row space via the bypass air duct. With such a configuration, it is possible to reduce the resistance when the air is released to the back-row space so as to plan the amount of air to be released to target regions in the in-cabin space.

14 Claims, 6 Drawing Sheets

(56) References Cited

U.S. PATENT DOCUMENTS

| | | | | |
|---|---|---|---|---|
| 2012/0295529 | A1* | 11/2012 | Fukutomi | B60H 1/00842 |
| | | | | 454/152 |
| 2018/0326812 | A1* | 11/2018 | Ko | B60H 1/00685 |
| 2020/0238789 | A1* | 7/2020 | Kim | B60H 1/00007 |
| 2021/0001682 | A1* | 1/2021 | Schnaidt | B60H 1/00564 |
| 2022/0024276 | A1* | 1/2022 | Mullett | B60H 1/00028 |

* cited by examiner

100

VEHICLE AND AIR CONDITIONING SYSTEM THEREOF

CROSS-REFERENCE TO RELATED APPLICATIONS

This application claims the benefit of China Patent Application No. 202210217407.4 filed Mar. 7, 2022, the entire contents of which are incorporated herein by reference in its entirety.

TECHNICAL FIELD

The disclosure relates to the field of air conditioning of vehicles, and in particular provides a vehicle and an air conditioning system thereof.

BACKGROUND

A heating, ventilation and air conditioning (HVAC) assembly of a vehicle is mainly used to ensure that the temperature, humidity and freshness of air in an in-cabin space of the vehicle meet the quality standards. For instance, in order to ensure the temperature quality of air, when it is needed to reduce the temperature of air in the in-cabin space, a refrigerant circulation pipeline is switched on, and with the phase change of a refrigerant in the refrigerant circulation pipeline, cold energy is released to a surface of an evaporator. In this way, when the air entering the in-cabin space flows through the surface of the evaporator, the part of cold energy can be removed by means of the heat exchange between the air and the surface of the evaporator so as to reduce the temperature of air, and the part of air is released to the in-cabin space and then mixed with air in the in-cabin space so as to achieve desired temperature drop regulation. When it is needed to increase the temperature of air in the in-cabin space, a PTC is activated, and the air is heated so as to achieve desired temperature rise regulation.

Normally, air can be simultaneously supplied into a front-row space and a back-row space in the in-cabin space via an air supply outlet of the HVAC assembly. Since the front-row space and the back-row space share a blower assembly arranged close to the front-row space and due to the air resistance factor during delivery of the air, there is a problem that the air volume distributed to a back-row air duct will be thus restricted to a great extent. For example, as shown in data, the air volume distributed to the back-row air duct can usually only reach about 15% of the total air volume.

Accordingly, there is a need for a new technical solution to solve the problem described above.

BRIEF SUMMARY

Technical Problem

The disclosure is proposed in order to solve the technical problem described above at least to a certain extent, or solve at least part of the technical problem described above.

Technical Solution

In view of this, a first aspect of the disclosure provides an air conditioning system of a vehicle, the air conditioning system comprising: an air handling unit having a chamber, the air handling unit being capable of regulating the temperature of air entering the chamber; and an air duct group comprising an air supply duct in communication with an in-cabin space of the vehicle, the air supply duct comprising at least a back-row air duct that releases air to a back-row space in the in-cabin space; wherein the air conditioning system further comprises a bypass air duct, at least part of which does not have an intersecting portion with the air handling unit so as to reduce, at least in part, the resistance due to air having to flow through the air handling unit on the premise of allowing the air to enter the back-row space via the bypass air duct.

With such a configuration, it is possible to reduce the resistance when the air is released to the back-row space so as to plan the amount of air to be released to target regions in the in-cabin space.

Specifically, during the air conditioning system releasing air to the target regions in the in-cabin space, it is assumed that resistance will be generated when air flows through the air handling unit, and the resistance can be reduced or eliminated when air flows through the bypass air duct. Obviously, in the absence of other structural or control logic interference, more air will be released through the bypass air duct to the corresponding target region.

It should be understood that those skilled in the art can determine the specific form of the air handling unit according to actual needs. For example, the air handling unit may be a refrigerant circulation circuit (e.g., mainly comprising a compressor, a condenser, a throttling component, and an evaporator) that can be switched between a cooling mode and a heating mode (e.g., by means of a four-way valve), or may be a combination of a refrigerant circulation circuit and a PTC, the heating of air in the in-cabin space being achieved by PTC heating, and the cooling of air in the in-cabin space being achieved by the refrigerant circulation circuit.

It should be understood that those skilled in the art can determine the specific form of the air duct group according to actual needs. For example, the air duct group may only comprise an air supply duct, and may also comprise air ducts with other functions such as humidification and fresh air ventilation. It should be understood that those skilled in the art can determine the specific number of air ducts included in the air supply duct according to actual needs. For example, there may be one or more back-row air ducts, the specific orientation of the back-row air ducts may be the same or different, and in addition to the back-row air duct, there may be a front-row air duct or other air ducts with targeted orientations.

It should be understood that those skilled in the art can determine the specific form and position of arrangement of the bypass air duct and the position thereof relative to the air handling unit according to actual situations. For example, the bypass air duct may be a pipeline that is additionally provided in the chamber of the air handling unit and is insulated from and has no intersecting portion with the air handling unit, and the air selectively reaches the back-row air duct via one of the pipeline and the chamber. In this case, it is possible to achieve the function of a distribution in such a way as, but not limited to, allowing the pipeline and a windward face of the chamber to have a set area ratio, so that the air can be released by two ways in a fixed proportion; and the volumes of air entering the pipeline and the chamber can be regulated through the corresponding structural or control logic intervention, so that the air can be released by two ways in an adjustable proportion.

For the air conditioning system of a vehicle described above, in a possible embodiment, the bypass air duct comprises a first portion and a second portion as viewed in a direction of air flowing to the back-row air duct, wherein at least the second portion does not have an intersecting portion with the air handling unit.

With such a configuration, a possible structural form of the bypass air duct is provided.

It should be understood that those skilled in the art can determine the specific structural form and dimensional limitation of the first/second portion and the relative position and cooperation relationship between the first and second portions and the air handling unit according to actual needs. Exemplarily, the first portion and the second portion are of a continuous structure with the same cross section, and neither of them intersects the air handling unit.

For the air conditioning system of a vehicle described above, in a possible embodiment, the air handling unit comprises an evaporator, and the first portion has an intersecting portion with at least part of the evaporator.

With such a configuration, a possible structural form of the bypass air duct is provided.

It should be understood that those skilled in the art can determine the form in which the first portion forms an intersecting portion with the evaporator, the proportion of the intersecting portion, etc. according to actual needs. For example, all or part of the region of the first portion along the cross section thereof has an intersecting portion with the evaporator.

For the air conditioning system of a vehicle described above, in a possible embodiment, the air handling unit further comprises a compressor, a throttling component and a condenser, and the compressor, the evaporator, the throttling component and the condenser form a refrigerant circulation circuit.

With such a configuration, a specific structural form of the air handling unit is provided.

For example, it may be the following case: the air can be cooled as it flows over the surface of the evaporator in the refrigerant circulation circuit. Alternatively, it may be the following case: a four-way valve is additionally provided in the refrigerant circulation circuit according to actual needs, and it is possible to achieve both cooling/heating treatment of air by means of switching the communication mode of the four-way valve.

For the air conditioning system of a vehicle described above, in a possible embodiment, the air handling unit comprises an independent heating component capable of increasing the temperature of the air entering the chamber.

With such a configuration, a specific structural form of the air handling unit is provided. For example, the heating component is a PTC.

For the air conditioning system of a vehicle described above, in a possible embodiment, the second portion has an intersecting portion with the portion of the evaporator close to the lower side.

With such a configuration, a possible structural form of the intersecting portion is provided.

For the air conditioning system of a vehicle described above, in a possible embodiment, a mounting structure is formed in the first portion, and the evaporator is fixed to the vehicle by means of the mounting structure.

With such a configuration, a specific mechanism that forms the intersecting portion is provided.

For the air conditioning system of a vehicle described above, in a possible embodiment, a switching component is provided in the second portion, wherein by means of the switching component, the first portion is in communication with the back-row air duct via the second portion and/or the air handling unit.

In this way, a specific structural form of the bypass air duct is provided.

It should be understood that those skilled in the art can determine the specific form and number of the switching component and the specific way by which the switching component is provided in the second portion. Exemplarily, a wall of the second portion is provided with an opening, a solenoid valve is provided at the opening so that the state of communication between the second portion and the chamber is achieved through the on and off of this solenoid valve, and another solenoid valve is provided in the second portion so that the state of communication between the second portion and the back-row air duct is achieved through the on and off of this solenoid valve.

For the air conditioning system of a vehicle described above, in a possible embodiment, the switching component comprises a first switching component, which is movably arranged in the second portion, and based on which the state of communication between the second portion and the back-row air duct is switched.

With such a configuration, a possible structural form of the switching component is provided.

It should be understood that those skilled in the art can determine the specific structural form of the first switching component, the position of arrangement thereof in the second portion, the specific movable manner thereof, etc. according to actual needs. Exemplarily, the first switching component is a damper rotatably arranged in the second portion.

For the air conditioning system of a vehicle described above, in a possible embodiment, the first switching component is provided with a driving mechanism, and the first switching component is rotatably arranged in the second portion by means of the driving mechanism.

With such a configuration, a specific structural form of the first switching component is provided. Exemplarily, the driving mechanism is an electric motor mounted on an outer wall of the second portion.

For the air conditioning system of a vehicle described above, in a possible embodiment, the switching component comprises a second switching component, which is movably provided at the first portion and/or the second portion, and based on which the proportion of air entering the second portion and the chamber can be adjusted.

With such a configuration, a possible structural form of the switching component is provided.

It should be understood that those skilled in the art can determine the specific structural form of the second switching component, the specific way and position thereof in the first portion and/or the second portion, the specific movable way thereof, etc. according to actual needs. Exemplarily, the second switching component is of a plate-like structure arranged on the upstream side of the second portion in a retractable manner. The second switching component extends from the second portion, so that the flow path of at least part of air that would otherwise flow into the chamber can be changed, and specifically, can be changed to reach the back-row space via the second portion.

For the air conditioning system of a vehicle described above, in a possible embodiment, the second portion has a cross section that is of a structure closed along the circumference, and the first portion has a cross section that is at least partially of a structure having an open portion along the circumference.

With such a configuration, a specific structural form of the bypass air duct is provided.

It should be understood that those skilled in the art can determine the specific structural form formed, based on the closing/opening, according to actual needs. Exemplarily, the cross section of the first portion is polygonal (partly unclosed), and the cross section of the second portion is circular.

For the air conditioning system of a vehicle described above, in a possible embodiment, the maximum dimension of the cross section of the bypass air duct in the height direction of the vehicle is ≥30 mm.

With such a configuration, a specific structural form of the bypass air duct is provided.

For the air conditioning system of a vehicle described above, in a possible embodiment, at least part of the dimension of the cross section of the first portion in the height direction of the vehicle is greater than at least part of the dimension of the cross section of the second portion in the height direction of the vehicle.

With such a configuration, a specific structural form of the bypass air duct is provided. Exemplarily, the second portion has approximately the same shape of the cross section at positions in the axial direction thereof and has approximately the same dimension of the cross section in the height direction of the vehicle, the first portion has approximately the same shape of the cross section at positions in the axial direction thereof and has the dimension of the cross section in the height direction of the vehicle gradually decreasing from upstream to downstream, and the first portion and the section portion have approximately the same dimension/size of the cross sections at the junction thereof.

For the air conditioning system of a vehicle described above, in a possible embodiment, the first portion and the second portion are in communication with each other in series and/or the second portion and the back-row air duct are in communication with each other.

With such a configuration, a way in which the bypass air duct is provided in the air conditioning system is provided.

For the air conditioning system of a vehicle described above, in a possible embodiment, the back-row air duct comprises a back-row face-blowing air duct and a back-row foot-blowing air duct, and a downstream end of the bypass air duct is connected to the back-row face-blowing air duct.

With such a configuration, a specific way of communication between the bypass air duct and the back-row face-blowing air duct is provided.

Specifically, due to an internal space structure of the HVAC assembly, the temperature of the air supplied to the back-row space tends to be the same in the face-blowing region and in the foot-blowing region. Taking heating as an example, assuming that this temperature reaches about 40° C., it is unbearable for the face-blowing region in the back-row space. The bypass air duct is in communication with the face-blowing air duct, which improves the comfort of the back-row space on the premise of increasing the air volume demand. For example, a switching component (which may be denoted as a third switching component) may be provided for the face-blowing region, and when a temperature difference control is required, the second portion is in communication with the face-blowing air duct but not in communication with the foot-blowing air duct. Exemplarily, the third switching component is arranged in the foot-blowing air duct.

A second aspect of the disclosure provides a vehicle, which comprises an air conditioning system of a vehicle according to any one of the foregoing.

It should be understood that the vehicle has all technical effects of the air conditioning system of a vehicle according to any one of the foregoing, which will not be repeated herein.

Proposal 1. An air conditioning system of a vehicle, the air conditioning system comprising:
an air handling unit having a chamber, the air handling unit being capable of regulating the temperature of air entering the chamber; and
an air duct group comprising an air supply duct in communication with an in-cabin space of the vehicle, the air supply duct comprising at least a back-row air duct that releases air to a back-row space in the in-cabin space;
wherein the air conditioning system further comprises:
a bypass air duct, at least part of which does not have an intersecting portion with the air handling unit so as to
reduce, at least in part, the resistance due to air having to flow through the air handling unit on the premise of allowing the air to enter the back-row space via the bypass air duct.

Proposal 2. The air conditioning system of a vehicle according to proposal 1, wherein the bypass air duct comprises a first portion and a second portion as viewed in a direction of air flowing to the back-row air duct,
wherein at least the second portion does not have an intersecting portion with the air handling unit.

Proposal 3. The air conditioning system of a vehicle according to proposal 2, wherein the air handling unit comprises an evaporator, and the first portion has an intersecting portion with at least part of the evaporator.

Proposal 4. The air conditioning system of a vehicle according to proposal 3, wherein the air handling unit further comprises a compressor, a throttling component and a condenser, and the compressor, the evaporator, the throttling component and the condenser form a refrigerant circulation circuit.

Proposal 5. The air conditioning system of a vehicle according to proposal 3, wherein the air handling unit comprises an independent heating component capable of increasing the temperature of the air entering the chamber.

Proposal 6. The air conditioning system of a vehicle according to proposal 3, wherein the first portion has an intersecting portion with the portion of the evaporator close to the lower side.

Proposal 7. The air conditioning system of a vehicle according to proposal 4, wherein a mounting structure is formed in the first portion, and the evaporator is fixed to the vehicle by means of the mounting structure.

Proposal 8. The air conditioning system of a vehicle according to any one of proposals 2 to 7, wherein a switching component is provided in the second portion,
wherein by means of the switching component, the first portion is in communication with the back-row air duct via the second portion and/or the air handling unit.

Proposal 9. The air conditioning system of a vehicle according to proposal 8, wherein the switching component comprises a first switching component, which is movably arranged in the second portion, and based on which the state of communication between the second portion and the back-row air duct is switched.

Proposal 10. The air conditioning system of a vehicle according to proposal 9, wherein the first switching component is provided with a driving mechanism, and the first switching component is rotatably arranged in the second portion by means of the driving mechanism.

Proposal 11. The air conditioning system of a vehicle according to proposal 8, wherein the switching component comprises a second switching component, which is movably provided at the first portion and/or the second portion, and based on which the proportion of air entering the second portion and the chamber can be adjusted.

Proposal 12. The air conditioning system of a vehicle according to proposal 2, wherein the second portion has a cross section that is of a structure closed along the circumference, and the first portion has a cross section that is at least partially of a structure having an open portion along the circumference.

Proposal 13. The air conditioning system of a vehicle according to proposal 2, wherein the maximum dimension of the cross section of the bypass air duct in the height direction of the vehicle is ≥30 mm.

Proposal 14. The air conditioning system of a vehicle according to proposal 2, wherein at least part of the dimension of the cross section of the first portion in the height direction of the vehicle is greater than at least part of the dimension of the cross section of the second portion in the height direction of the vehicle.

Proposal 15. The air conditioning system of a vehicle according to proposal 2, wherein the first portion and the second portion are in communication with each other in series and/or
the second portion and the back-row air duct are in communication with each other.

Proposal 16. The air conditioning system of a vehicle according to proposal 1, wherein the back-row air duct comprises a back-row face-blowing air duct and a back-row foot-blowing air duct, and a downstream end of the bypass air duct is connected to the back-row face-blowing air duct.

Proposal 17. a vehicle, comprising an air conditioning system of a vehicle according to any one of proposals 1 to 16.

BRIEF DESCRIPTION OF THE SEVERAL VIEWS OF THE DRAWINGS

The air conditioning system of the disclosure will be described below with reference to the accompanying drawings and on the basis that the switching component comprises only the first switching component. In the accompanying drawings.

Figure 1:
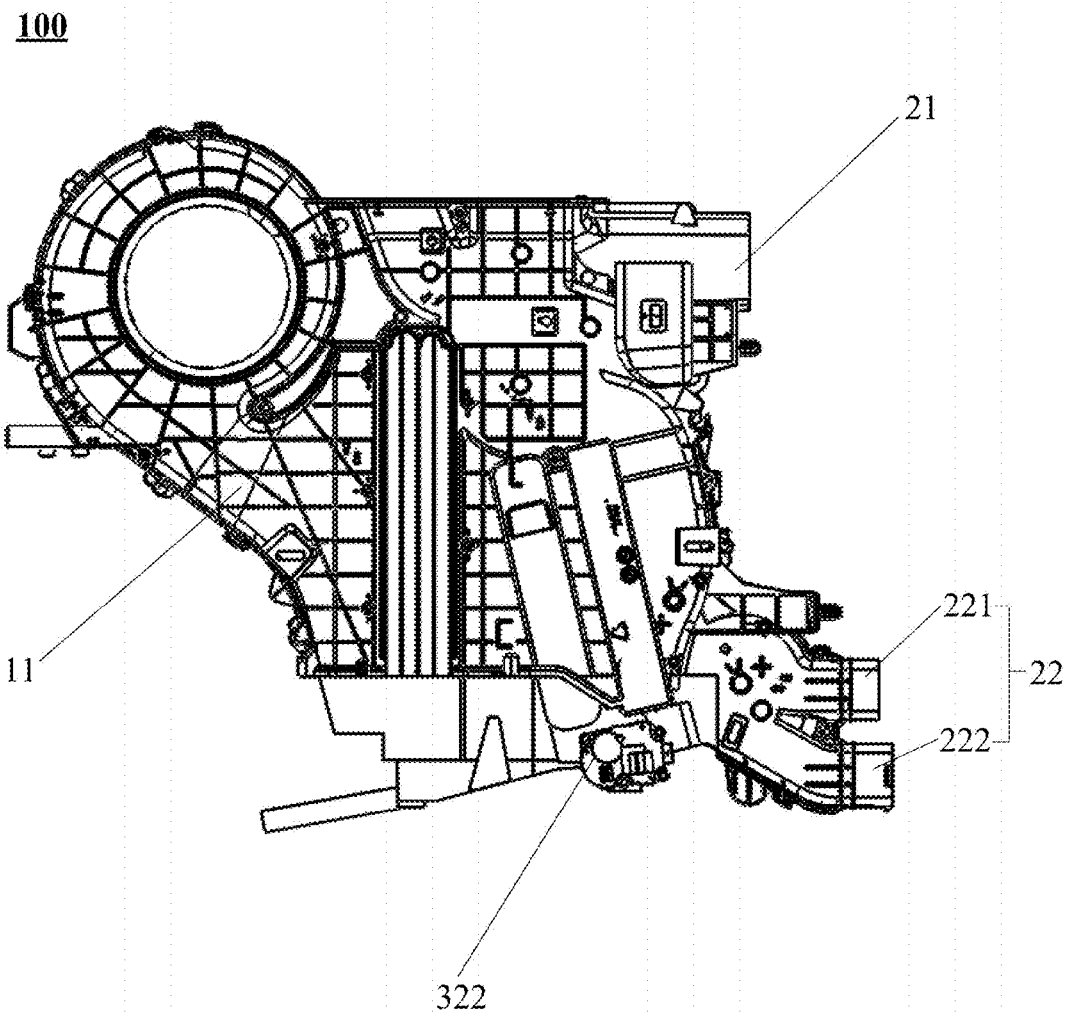
FIG. 1 shows a schematic structural view of an air conditioning system of a vehicle according to an embodiment of the disclosure.

LIST OF REFERENCE NUMERALS 100. air conditioning system; 11. blower; 12. evaporator; 121. air filter element; 13. condenser; 14. PTC; 2. air duct group; 21. front-row air duct; 22. back-row air duct; 221. back-row face-blowing air duct; 222. back-row foot-blowing air duct; 3. bypass air duct; 31. first portion; 32. second portion; 321. damper; 322. electric motor.

DETAILED DESCRIPTION

Preferred embodiments of the disclosure are described below with reference to the accompanying drawings. Those skilled in the art should understand that these implementations are only used to explain the technical principles of the disclosure, and are not intended to limit the scope of protection of the disclosure. Although this embodiment is described with the switching component comprising only a rotatable damper as the first switching component, obviously, it is also possible to use another structure as the first switching component or additionally provide a second switching component in addition to the first switching component, etc.

It should be noted that in the description of the disclosure, the terms, such as "center", "upper", "lower", "left", "right", "vertical", "horizontal", "inner" and "outer", that indicate directions or positional relationships are based on the directions or positional relationships shown in the drawings only for convenience of description, and do not indicate or imply that the device or element must have a specific orientation, be constructed and operated in a specific orientation, and therefore cannot be construed as limitation to the disclosure. In addition, the terms "first", "second", and "third" are for descriptive purposes only, and may not be interpreted as indicating or implying relative importance. The terms "a/an" and "this" in the singular form may also include the plural form.

In addition, it should also be noted that, in the description of the disclosure, the terms "mount", "engage" and "connect" should be interpreted in a broad sense unless explicitly defined and limited otherwise, which, for example, may mean a fixed connection, a detachable connection or an integral connection; or may mean a mechanical connection or an electrical connection; or may mean a direct connection, an indirect connection by means of an intermediary, or internal communication between two elements. For those skilled in the art, the specific meaning of the above-mentioned terms in the disclosure can be interpreted according to the specific situation.

In addition, for better description of the disclosure, many details are provided in the following specific implementations, and those skilled in the art should understand that, without some specific details, the disclosure can still be implemented. In some instances, the operating principles and the like of the air conditioning system well known to those skilled in the art are not described in detail in order to highlight the gist of the disclosure.

Figure 2:
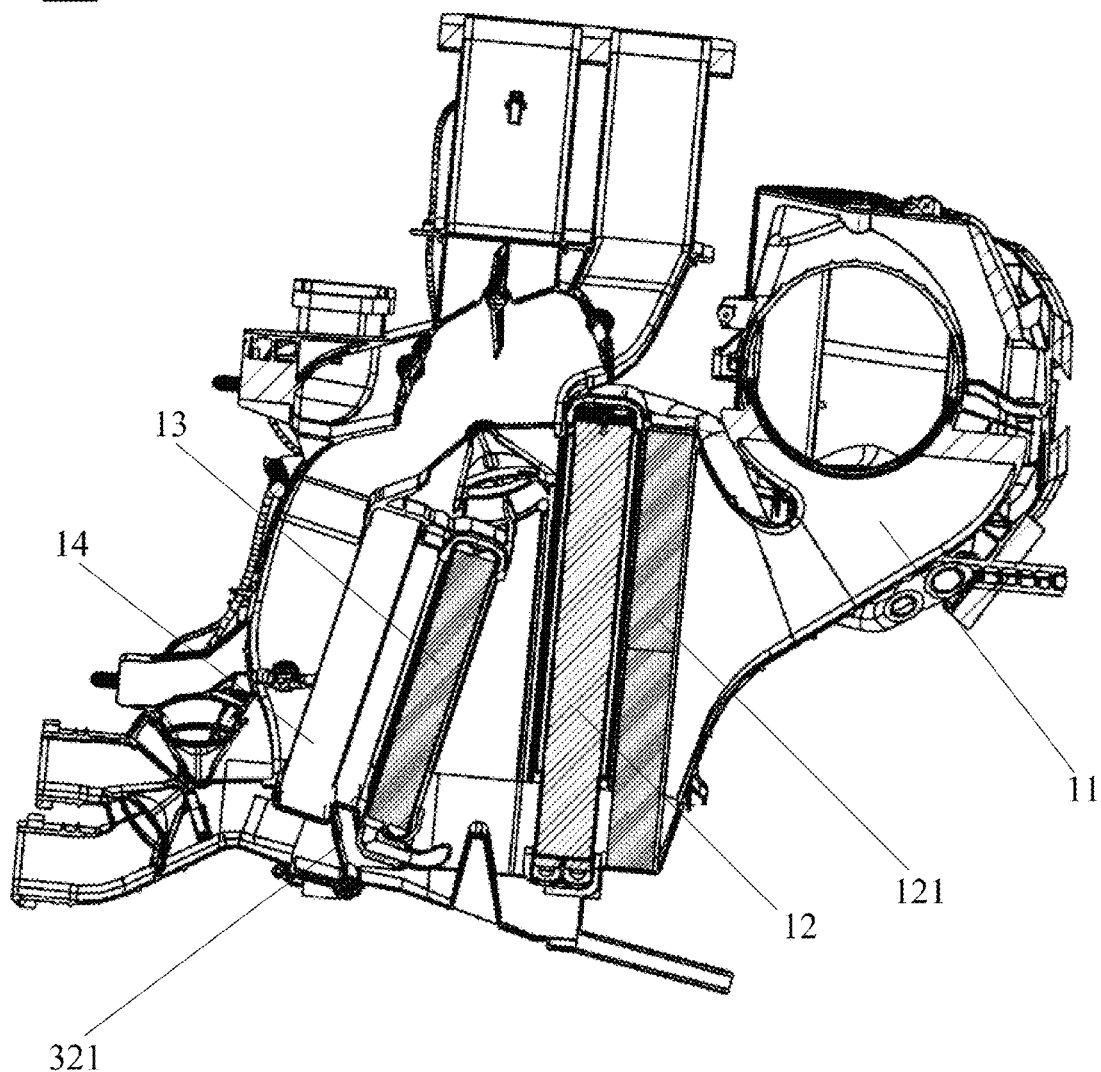
FIG. 2 shows a first schematic cross-sectional view of an air conditioning system of a vehicle according to an embodiment of the disclosure, in which an evaporator, a condenser, etc. of an air handling unit are not removed.
Figure 3:
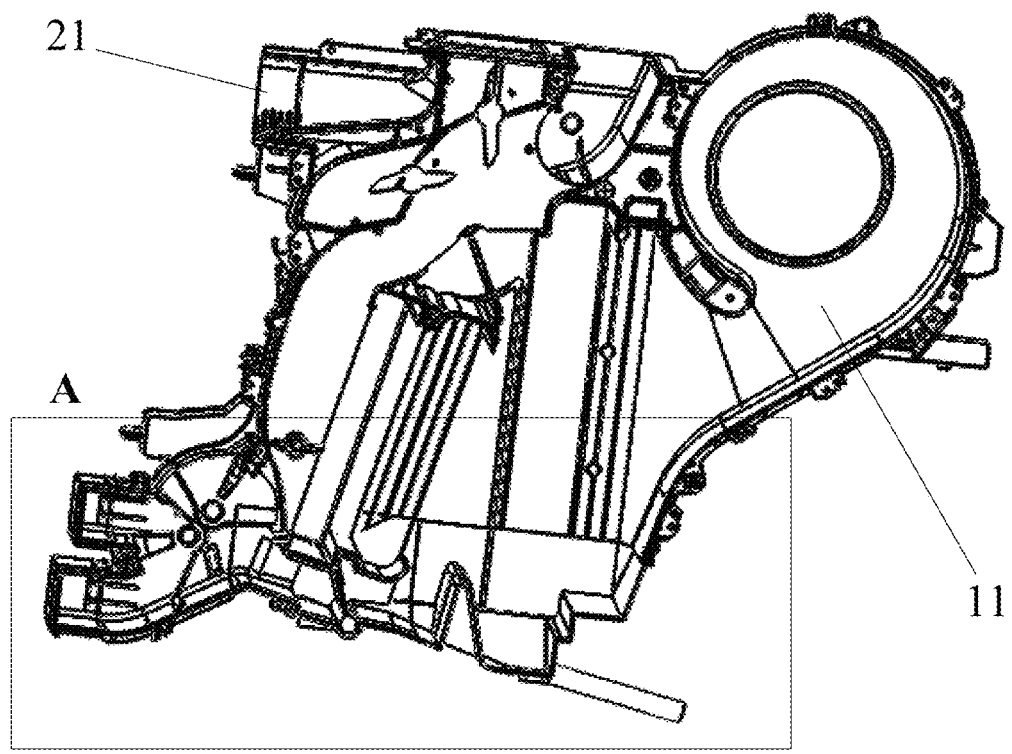
FIG. 3 shows a second schematic cross-sectional view of an air conditioning system of a vehicle according to an embodiment of the disclosure, in which an evaporator, a condenser, etc. of an air handling unit are removed.
Figure 4:
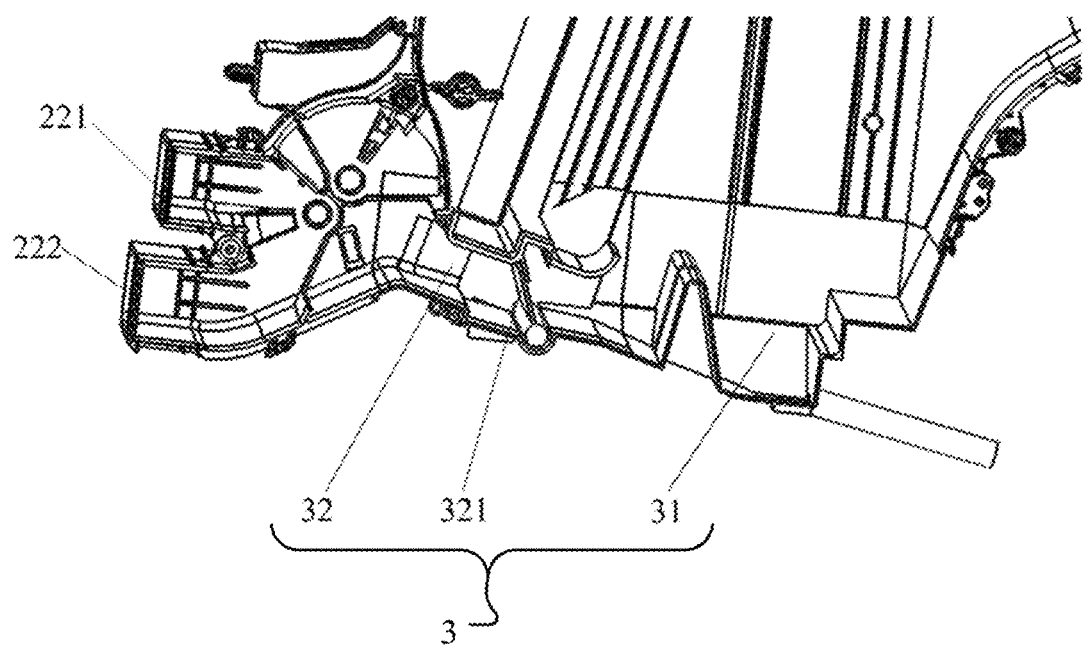
FIG. 4 shows a schematic enlarged view of part A in FIG. 3.
Figure 5:
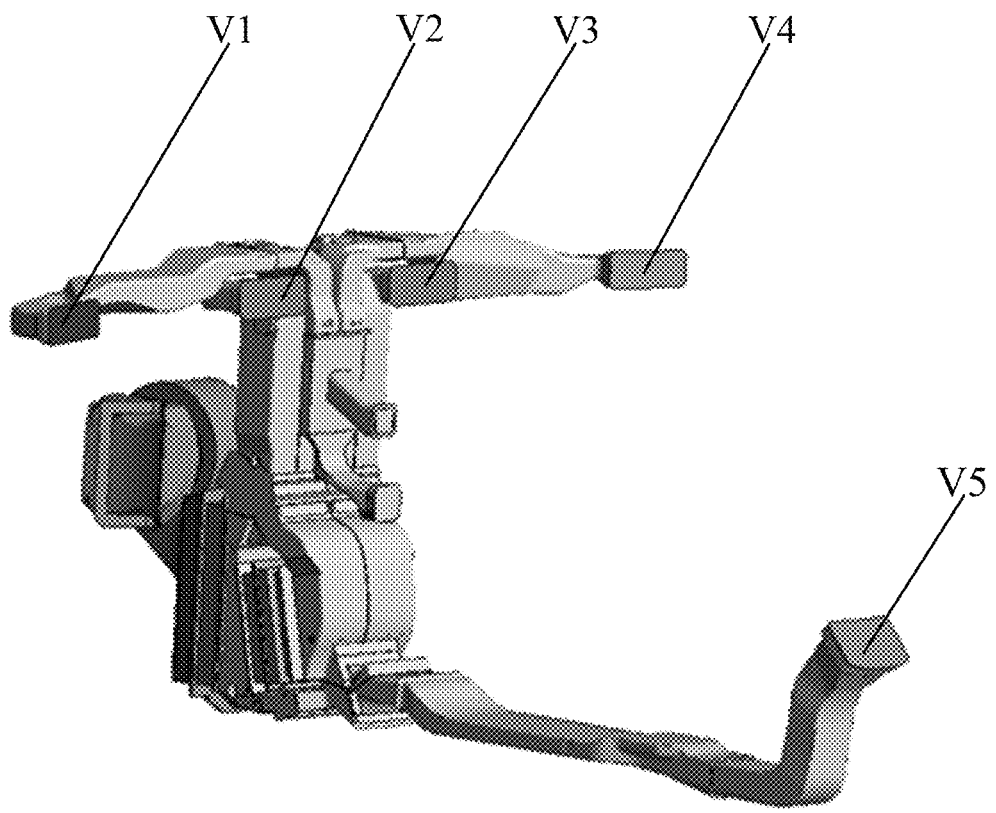
FIG. 5 shows a schematic structural view of an air duct group of an air conditioning system of a vehicle according to an embodiment of the disclosure.

Referring to FIGS. 1 to 5, FIG. 1 shows a schematic structural view of an air conditioning system of a vehicle according to an embodiment of the disclosure, FIG. 2 shows a first schematic cross-sectional view of an air conditioning system of a vehicle according to an embodiment of the disclosure, FIG. 3 shows a second schematic cross-sectional view of an air conditioning system of a vehicle according to an embodiment of the disclosure, FIG. 4 shows a schematic enlarged view of part A in FIG. 3, and FIG. 5 shows a schematic structural view of an air duct group of an air conditioning system of a vehicle according to an embodiment of the disclosure. As shown in FIGS. 1 to 5, an air conditioning system 100 of a vehicle mainly comprises an air handling unit, an air duct group 2 and a bypass air duct 3. The air handling unit is mainly used to regulate the temperature of air delivered into an in-cabin space of the vehicle, the air duct group is mainly used to deliver air to a target region in the in-cabin space, and the bypass air duct is mainly used to regulate the air volume of a back-row region in the in-cabin space.

In a possible embodiment, the air handling unit mainly comprises a housing in which a chamber is formed, and functional components of the air handling unit mainly include a blower 11, a compressor, a throttling component (e.g., an electronic expansion valve), an evaporator 12, and a condenser 13, with the evaporator being provided with an air filter element 121 on the side close to the blower, and the compressor, the condenser, the electronic expansion valve, the evaporator and the compressor are sequentially connected to form a refrigerant circulation circuit. In this way, air enters the chamber under the action of the blower, and when the air flows over a surface of the evaporator, it is possible to reduce the temperature of the air to be delivered to the in-cabin space. The air conditioning system further comprises an independent heating component PTC 14 that is mainly used to increase the temperature of the air to be delivered to the in-cabin space by means of directly heating the air.

In a possible embodiment, the air duct group 2 mainly comprises an air supply duct in communication with the in-cabin space of the vehicle, and the air supply duct comprises front-row air ducts 21 that release air to a front-row space in the in-cabin space and back-row air ducts 22 that release air to a back-row space in the in-cabin space. In this example, the front-row air ducts include four front-row air ducts, V1, V2, V3, and V4, and the back-row air ducts 22 include a back-row face-blowing air duct 221 and a back-row foot-blowing air duct 222. In this example, the back-row face-blowing air duct 221 is an air duct V5 (the foot-blowing air duct is omitted in the example shown in FIG. 5).

In a possible embodiment, the bypass air duct 3 comprises a first portion 31 and a second portion 32, and the entire bypass air duct is located at a position close to the lower side of the air handling unit. The first portion 31 is located at a position close to the lower side of the air handling unit and has a certain intersection with the evaporator 12 in the first portion. Specifically, there is an overlapping portion between the portion of the evaporator 12 close to the lower side and the projection of the first portion 31 along the axial direction of the first portion 31. The second portion 32 is completely located below the air handling unit, and thus has no intersecting portion with the evaporator 12, the condenser 13, etc. inside that may cause the generation of air resistance.

In this example, the specific structural form of the first portion 31 having a certain intersecting portion with the evaporator 12 is as follows: a part of mounting structure corresponding to the evaporator 12 is formed in the first portion 31, and another part of mounting structure of the evaporator 12 is located at a position close to the upper side of the housing, the two parts of mounting structure forming a mounting space for the evaporator 12. The specific structural form in which the second portion 32 does not have an intersecting portion with the air handling unit is as follows: a part of mounting structure corresponding to the condenser 13 is formed at an outer wall close to the top of the second portion 32, and another part of mounting structure of the condenser 13 is located at a position close to the upper side of the housing, the two parts of mounting structure forming a mounting space corresponding to the condenser 13.

In a possible embodiment, a damper 321 as the first switching component is provided in the second portion 32, the damper is provided with an electric motor 322, and the electric motor 322 drives the damper 321 to be rotatably arranged in the second portion 32, so as to adjust the state of communication of the second portion 32, for example, to be switched among a fully communicating state, a partially communicating state (e.g., 30%, 50%, and 70%) and a non-communicating state.

In a possible embodiment, the first portion 31 has a cross section that is of a structure having an open portion along the circumference, specifically, the portion close to the upper side is open. The second portion 32 has a cross section that is of a structure closed along the circumference, for example, that is substantially circular.

In this example, the dimension of the cross section of the first portion 31 in the height direction (the Z-direction) of the vehicle is relatively large, and the dimension of the cross section of the second portion 32 in the Z-direction is relatively small. It is determined by analysis that the maximum dimension of the cross section of the first portion 31 in the Z-direction should not be less than 30 mm.

Figure 6:
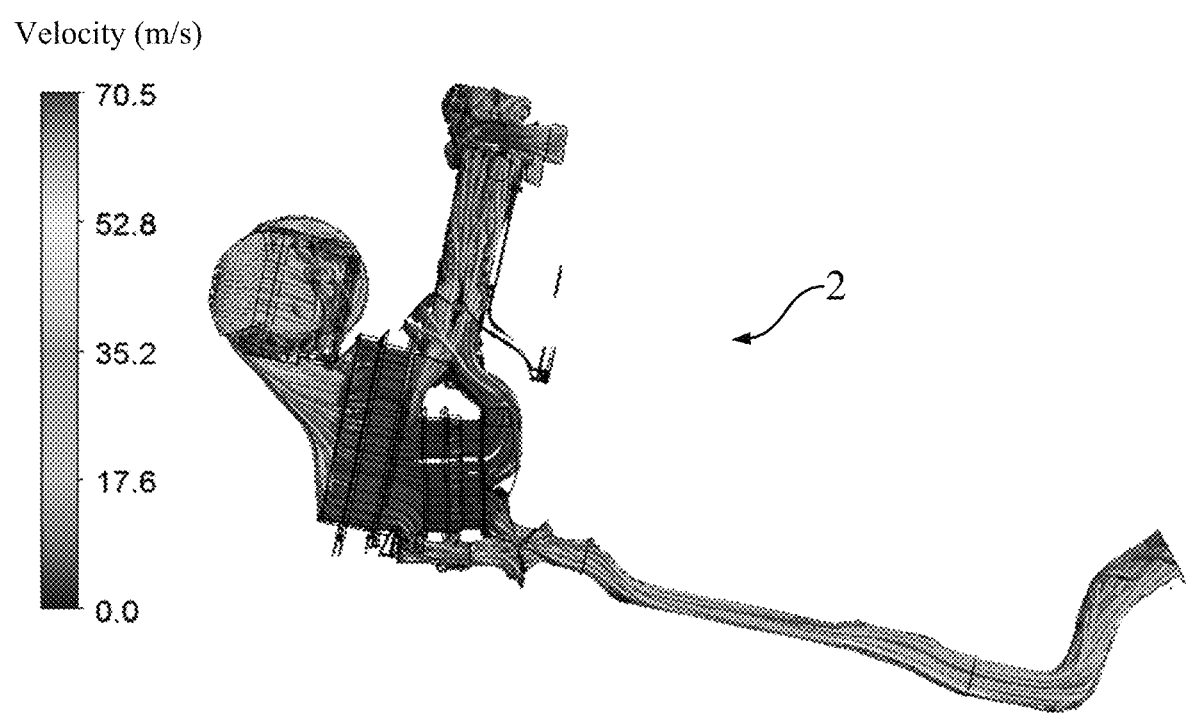
FIG. 6 shows a schematic diagram of the velocity of air flowing through different portions of an air conditioning system of a vehicle according to an embodiment of the disclosure.

Referring to FIG. 6, FIG. 6 shows a schematic diagram of the velocity of air flowing through different portions of an air conditioning system of a vehicle according to an embodiment of the disclosure. It is assumed that the blower speed is 3200 rpm, the damper 321 in the second portion 32 is fully open, and the back pressure at an outlet of the air duct is 0 Pa. As shown in FIG. 6, during the delivery of air to the in-cabin space, the velocity of air flowing through the air handling unit is significantly less than the velocity of air flowing through the bypass air duct 3. The higher velocity indicates less air resistance when air flows through this place, and with less air resistance, it is desired that a larger percentage of air is available here. For example, when air flows through the roughly middle portion of the second portion 32, the air volume detected here is 142.5 m$^3$/h.

The technical effect of the air conditioning system of a vehicle according to the disclosure due to the addition of the bypass air duct 3 will be further verified below based on the comparison of a set of data.

Table 1 shows the detected air volume at V1-V5 and the calculated percentage of air volume distribution when the damper 321 is in a closed state.

TABLE 1

Air volume and percentage when a damper is in a closed state

| Position | Air volume (m$^3$/h) | Percentage (%) |
|---|---|---|
| V1 | 131.6 | 18.20% |
| V2 | 148.2 | 20.60% |
| V3 | 143.9 | 19.90% |
| V4 | 128.2 | 17.80% |
| V5 | 169.3 | 23.50% |
| Total air volume | 721.2 | |

It can be seen that the total air volume of the front-row air duct 21 accounts for nearly 80% when the damper 321 is closed. Specifically, at this time, since the air can only pass through the air handling unit when the air reaches V5, and since the blower is closer to V1-V4, a smaller percentage of the air volume can be distributed to the back-row air duct.

In addition, since there will be an equivalent level of air resistance when air is delivered to any of V1-V5, the total air volume is 721.2 m³/h.

Table 2 shows the detected air volume at V1-V5 and the calculated percentage of air volume distribution when the damper is in a fully opened state. That is the air volumes and relationship of the air ducts in the working conditions corresponding to FIG. 6.

TABLE 2

Air volume and percentage when the damper is in a fully opened state

| Position | Air volume (m³/h) | Percentage |
|---|---|---|
| V1 | 126.6 | 16.40% |
| V2 | 144 | 18.70% |
| V3 | 138.4 | 18.00% |
| V4 | 125.1 | 16.20% |
| V5 | 236.7 | 30.70% |
| Total air volume | 770.6 | |

It can be seen that the total air volume of the back-row air duct 22 accounts for nearly 30% when the damper is closed. Specifically, at this time, since the air only passes through the evaporator 12 in the air handling unit when the air reaches V5, the air resistance is significantly reduced, the percentage of the air reaching V5 is significantly increased, and the total air volume is increased to 770.6 m³/h.

In addition, since the air reaching V5 only passes through a small part of the evaporator 12, it is not possible to generate the same temperature rise as that at V1-V4 due to heat exchange. At this time, it is possible to make adjustment as follows: in the case where the back-row air duct 22 comprises a back-row face-blowing air duct 221 and a back-row foot-blowing air duct 222, only the bypass air duct 3 is in communication with the back-row face-blowing air duct 221. In this way, it is expected to achieve different temperatures in the face-blowing region (achieved through the back-row face-blowing air duct) and in the foot-blowing region (achieved through the back-row foot-blowing air duct) in the back-row space. For example, 18-25° C. air that is more comfortable is provided in the face-blowing region, and air with a temperature up to 40° C. can be provided in the foot-blowing region, so that on the premise of increasing the air volume proportion, the differentiated temperature control is achieved for the face-blowing region and the foot-blowing region, thereby improving the user comfort in the back-row space.

Heretofore, the technical solutions of the disclosure have been described with reference to the preferred embodiments shown in the accompanying drawings. However, those skilled in the art can readily understand that the scope of protection of the disclosure is apparently not limited to these specific embodiments. Those skilled in the art can make equivalent changes or substitutions to the related technical features without departing from the principle of the disclosure, and all the technical solutions with such changes or substitutions shall fall within the scope of protection of the disclosure.

What is claimed is:

1. An air conditioning system of a vehicle, the air conditioning system comprising:
an air handling unit having a chamber, the air handling unit being capable of regulating the temperature of air entering the chamber; and
an air duct group comprising an air supply duct in communication with an in-cabin space of the vehicle, the air supply duct comprising at least a back-row air duct that releases air to a back-row space in the in-cabin space;
wherein the air conditioning system further comprises:
a bypass air duct located at a position adjacent to a lower side of the air handling unit, at least part of which does not have an intersecting portion with the air handling unit so as to reduce, at least in part, the resistance due to air having to flow through the air handling unit on the premise of allowing the air to enter the back-row space via the bypass air duct;
wherein the bypass air duct comprises a first portion and a second portion as viewed in a direction of air flowing to the back-row air duct;
wherein at least the second portion does not have an intersecting portion with the air handling unit; and
wherein the air handling unit comprises an evaporator located in the chamber, and the first portion has an intersecting portion with at least part of the evaporator.

2. The air conditioning system of a vehicle, according to claim 1, wherein the air handling unit further comprises a compressor, a throttling component, and a condenser, and the compressor, the evaporator, the throttling component, and the condenser form a refrigerant circulation circuit.

3. The air conditioning system of a vehicle according to claim 1, wherein the air handling unit comprises an independent heating component capable of increasing the temperature of the air entering the chamber.

4. The air conditioning system of a vehicle according to claim 1, wherein the first portion has an intersecting portion with the portion of the evaporator close to the lower side.

5. The air conditioning system of a vehicle according to claim 1, wherein a switching component is provided in the second portion,
wherein the first portion is in communication with the back-row air duct via the second portion and/or the air handling unit by means of the switching component.

6. The air conditioning system of a vehicle according to claim 5, wherein the switching component comprises a first switching component, which is movably arranged in the second portion, and based on which the state of communication between the second portion and the back-row air duct is switched.

7. The air conditioning system of a vehicle according to claim 6, wherein the first switching component is provided with a driving mechanism, and the first switching component is rotatably arranged in the second portion by means of the driving mechanism.

8. The air conditioning system of a vehicle according to claim 1, wherein the second portion has a cross section that is of a structure closed along the circumference, and the first portion has a cross section that is at least partially of a structure having an open portion along the circumference.

9. The air conditioning system of a vehicle according to claim 1, wherein the maximum dimension of the cross section of the bypass air duct in the height direction of the vehicle is ≥30 mm.

10. The air conditioning system of a vehicle according to claim 1, wherein at least part of the dimension of the cross section of the first portion in the height direction of the vehicle is greater than at least part of the dimension of the cross section of the second portion in the height direction of the vehicle.

11. The air conditioning system of a vehicle according to claim 1, wherein the first portion and the second portion are in communication with each other in series and/or
    the second portion and the back-row air duct are in communication with each other.

12. The air conditioning system of a vehicle according to claim 1, wherein the back-row air duct comprises a back-row face-blowing air duct and a back-row foot-blowing air duct, and a downstream end of the bypass air duct is connected to the back-row face-blowing air duct.

13. A vehicle, comprising an air conditioning system of a vehicle according to claim 1.

14. The air conditioning system of a vehicle according to claim 1, wherein a wall of the second portion is provided with an opening, and a solenoid valve is provided at the opening so that the state of communication between the second portion and the chamber is achieved through the on and off of the solenoid valve.

\* \* \* \* \*